United States Patent [19]
Saito et al.

[11] Patent Number: 5,644,663
[45] Date of Patent: Jul. 1, 1997

[54] PORTABLE IMAGE SCANNER HAVING MANUAL OR AUTOMATIC FEED

[75] Inventors: Hidemi Saito, Yamanashi-ken; Takashi Kanda; Yoshihito Iida, both of Kofu; Naoto Mochizuki, Yamanashi-ken, all of Japan

[73] Assignee: NISCA Corporation, Yamanishi-ken, Japan

[21] Appl. No.: 419,521

[22] Filed: Apr. 10, 1995

Related U.S. Application Data

[63] Continuation of Ser. No. 104,545, Aug. 11, 1993, abandoned.

[30] Foreign Application Priority Data

| Aug. 11, 1992 | [JP] | Japan | 4-235432 |
| Aug. 11, 1992 | [JP] | Japan | 4-235433 |
| Aug. 11, 1992 | [JP] | Japan | 4-235434 |
| Nov. 14, 1992 | [JP] | Japan | 4-328525 |

[51] Int. Cl.$^6$ .................................................. G06K 9/22
[52] U.S. Cl. ........................................ 382/313; 358/473
[58] Field of Search .................................. 358/473, 494, 358/496, 497, 498; 250/234; 382/312, 313, 323; H04N 1/04, 1/12

[56] References Cited

U.S. PATENT DOCUMENTS

| 4,574,317 | 3/1986 | Scheible | 358/285 |
| 4,652,937 | 3/1987 | Shimura et al. | 358/286 |
| 4,667,253 | 5/1987 | Chen | 358/293 |
| 4,677,495 | 6/1987 | Ito et al. | 358/285 |
| 4,793,812 | 12/1988 | Sussman et al. | 434/116 |
| 4,962,526 | 10/1990 | Kotani et al. | 379/100 |
| 4,989,237 | 1/1991 | Kotani et al. | 379/100 |
| 5,166,812 | 11/1992 | Dow et al. | 358/498 |
| 5,172,243 | 12/1992 | Hayashi et al. | 358/400 |
| 5,182,450 | 1/1993 | Pan | 250/234 |
| 5,264,947 | 11/1993 | Nishikawa et al. | 358/473 |
| 5,381,020 | 1/1995 | Kochis et al. | 250/566 |
| 5,446,559 | 8/1995 | Birk | 358/473 |

FOREIGN PATENT DOCUMENTS

| 0 359 180 | 3/1990 | European Pat. Off. | H04N 1/40 |
| 0 452 128 | 10/1991 | European Pat. Off. | H04N 1/04 |
| 57-85766 | 5/1982 | Japan | H04N 1/02 |
| 58-127753 | 8/1983 | Japan | H04N 1/04 |
| 61-251356 | 11/1986 | Japan | H04N 1/04 |
| 62-155563 | 10/1987 | Japan | H04N 1/04 |
| 63-42275 | 2/1988 | Japan | H04N 1/04 |
| 64-34059 | 2/1989 | Japan | H04N 1/04 |
| 2-22958 | 1/1990 | Japan | H04N 1/04 |
| 2-226958 | 9/1990 | Japan | H04N 1/12 |
| 4-117764 | 4/1992 | Japan | H04N 1/12 |
| 4-199484 | 7/1992 | Japan | 382/58 |
| 2 069 982 | 9/1981 | United Kingdom | B65H 5/26 |
| 2178263 | 2/1987 | United Kingdom | H04N 1/028 |
| 2 238 758 | 6/1991 | United Kingdom | G03G 15/00 |

OTHER PUBLICATIONS

Patent Abstracts of Japan, vol. 13, No. 226 (E–763), May 25, 1989, JP–A–01 034 060, Feb. 3, 1989.
Patent Abstracts of Japan, vol. 15, No. 58 (E–1032), Feb. 12, 1991, JP–A–2 285 764, Nov. 26, 1990.
Translation of Japan Kokai 4–199484, Tagawa et al., publ. Jul. 1992.
Translation of Japan Kokai 4–117764, Suzuki, publ. Apr. 1992.

*Primary Examiner*—Andrew Johns
*Attorney, Agent, or Firm*—Oblon, Spivak, McClelland, Maier & Neustadt, P.C.

[57] ABSTRACT

A portable image scanner capable of selecting a manual document loading mode in which a cover member is united to a scanner body to feed a cut-sheet document through a document passage defined between the united scanner body and cover member for scanning the document, or a self-propelling mode in which the cover member is separated from the scanner body to move the independent scanner body on a thick document such as a book. The scanner body has a document sensor for detecting the cut-sheet document placed in the document passage in the manual document loading mode, and the thick document in the self-propelling mode to prevent the scanner body moving on the document from falling out of the edge of the thick document.

8 Claims, 6 Drawing Sheets

PORTABLE IMAGE SCANNER HAVING MANUAL OR AUTOMATIC FEED

This application is a Continuation of application Ser. No. 08/104,545, filed on Aug. 11, 1993, now abandoned.

BACKGROUND OF THE INVENTION

Field of the Invention

This invention relates to an image scanner for automatically scanning a document to optically read out and output image date that is on the document to an image processing device such as a computer, and more particularly to a portable image scanner capable of selectively uniting a cover member to a scanner body to feed a cut-sheet document to be scanned, or detaching the cover member from the scanner body to move the independent scanner body on a thick document such as a book.

Description of the Prior Art

Portable image scanners can be generally classified into a manually scanning type for manually moving the scanner along an image face of a document to be scanned, and an automatic scanning type for automatically moving a given document moved relative to the scanner to read out the image on the document. The portable automatic image scanner capable of scanning the whole image face of a given document is in widespread use for various image processing or optical character recognition (OCR), replacing hand scanners which are manually handled for scanning only a part of the image on the document.

The portable image scanners capable of automatically moving on the image face of the given document are further subdivided into ① a document-feeding type portable scanner, generally called a "mannually document loading type scanner", capable of automatically feeding a cut-sheet document through a stationary scanner body to scan an image on the document, as proposed in U.S. Pat. No. 4,667,253, and U.S. Pat. No. 4,677,495; ② a scanner-moving type portable scanner, generally called a "self-propelling type scanner", capable of moving along an image face on a fixed document so as to obtain image data directly even from a thick book, as described in U.S. Patent No. 5,182,450, Japanese Patent Application Public Disclosures Nos. SHO 61-251356(A) and SHO 63-42275(A) and Japanese Utility Model Appln. Public Disclosure No. SHO 58-127753(A); and ③ a combined type portable scanner having both functions of the aforesaid document-feeding type scanner and the self-propelling type scanner, as proposed in Japanese Patent Appln. Public Disclosures Nos. HEI 2-226958(A), HEI 2-22958(A), and HEI 4-117764(A).

The prior art combined type portable scanner capable of selectively feeding the cut-sheet document and moving on the fixed document has excellent applicability to various purposes, but tends to be complicated in structure and therefore is susceptible to mechanical trouble and awkward to handle.

For instance, the combined type portable scanner of Japanese Pat. Appln. Pub. Discl. No. HEI 2-22958(A) is composed of a combination of a detachable image reading unit and a document feeding unit. The image reading unit of this conventional scanner has a driving motor and a train of gears including a coupling gear, and the document feeding unit has a driving roller and a train of gears including a counterpart coupling gear to be engaged with the coupling gear of the image reading unit, so that which rotational motion produced by the motor in the image reading unit is transmitted to the driving roller through the gears including the coupling gears, so as to forward a cut-sheet document. However, the document feeding unit of this conventional scanner incorporating the driving gears becomes complicated in structure, and therefore, the scanner is unduly large and difficult to carry.

There has not been proposed so far a portable scanner with an automatic document feeder capable of automatically feeding a plurality of cut-sheet documents one by one in succession, even if it can automatically feed a single cut-sheet document. Thus, conventional portable scanners are inconvenient in handling a number of cut-sheet documents. Furthermore, since the conventional portable scanner uses an external power source in spite of its normal user with a handheld computer or the like, it is restricted in its use.

The conventional "self-propelling" type portable scanner capable of moving by itself on a fixed document such as a thick book to scan an image on the document must be manually stopped by giving a stop instruction from an external image processing device to the scanner or lifting up the scanner by hand when the scanner moving on the document arrives at the edge of the document. If an operator fails to stop the scanner, the scanner will fall from the edge of the thick document.

OBJECT OF THE INVENTION

This invention is made to eliminate the drawbacks suffered by the conventional portable image scanner as described above and has an object to provide a simple and convenient portable image scanner capable of readily selecting a "manual document loading mode" in which a cut-sheet document is introduced by hand into a document entrance and then automatically fed to a document exit through an image reading portion, or a "self-propelling mode" in which a scanner body moves by itself on a fixed document to automatically read out the image data on the document.

Another object of this invention is to provide a portable image scanner capable of stably scanning the image on various kinds of documents with high resolution, and is well balanced to be easily handled.

Still another object of this invention is to provide a portable image scanner having a detachable document feeder capable of automatically feeding a plurality of documents one by one.

Yet another object of this invention is to provide a portable image scanner having a safety mechanism for automatically stopping a scanner body moving on a document for scanning when the scanner body arrives at the edge portion of the document.

SUMMARY OF THE INVENTION

To attain the object described above according to this invention, there is provided a portable image scanner comprising a scanner body including driving rollers for imparting a relative motion to a document to be scanned, and image reading means for scanning the document while relatively moving the document, and a cover member detachably attached to the scanner body so as to cover the bottom of the scanner body, wherein the cover member is attached to the scanner body to feed a cut-sheet document, and removed from the scanner body to allow the scanner body to move on a thick document such as a book.

The cover member is provided with press rollers which come into contact with the driving rollers of the scanner body to define a document passage including an image reading portion between the united scanner body and cover member, so as to stably feed the cut-sheet document through the document passage.

A document feeder having a document tray and document separation means can be attached to at least one of the scanner body and the cover member, so that a plurality of cut-sheet documents stacked on the document tray can be automatically sent out one by one into the document passage.

The scanner body is provided with a document sensor with the sensor lever dangling, and switching means which is actuated by the sensor lever. The sensor lever assumes its upright posture in the free state, meaning that no document is placed in the document passage. When the document to be scanned is in the document passage, the sensor lever is pushed up by the document to switch on the switching means, thus recognizing the document being ready for scanning.

By putting the scanner body separated from the cover member on a thick document such as a book, the sensor lever comes in touch with the document to detect the document, thereby allowing the scanner body to move on the document to scan the image on the document. When the moving scanner body arrives at the edge portion of the document, the sensor lever comes off from the edge of the document to halt the operation of the scanner body, thus preventing the scanner body from falling out of the thick document.

In the manual document loading mode in which the cover member is attached to the scanner body to define the document passage through which the cut-sheet document passes for scanning, the document sensor operated by the sensor lever serves to detect the leading edge of the cut-sheet document so as to provide timing information as to the scanning of the document under the control of a control system in the scanner body. The detection of the leading edge or end of the document is particularly useful for automatically feeding the cut-sheet documents one by one into the document passage defined between the united scanner body and cover member by use of the document feeder.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The other objects and features of the present invention will be hereinafter explained in detail with reference to the accompanying drawings, wherein.

DESCRIPTION OF THE PREFERRED EMBODIMENTS

The present invention will become more fully understood from the detailed description given hereinbelow and the accompanying drawings which are given by way of illustration only, and thus are not limitative of the present invention.

In the exemplary embodiment of the invention as described in the drawings, a portable image scanner of this invention generally comprises a scanner body 1, a cover member 20 which is detachably attached to the scanner body 1, and a document feeder 30. By uniting the cover member 20 to the scanner body 1, a cut-sheet document of a standard size can be automatically fed through a document passage P defined between the united scanner body 1 and cover member 20 for scanning an image printed on the document (manual document loading mode). By detaching the cover member 20 from the scanner body 1, the scanner body 1 can itself move on a thick document such as a book while reading out image data from the document (self-propelling mode). When the document feeder 30 is attached to the united scanner body 1 and cover member 20, a plurality of cut-sheet documents can be automatically fed one by one into the document passage P formed between the united scanner body 1 and cover member 20 (automatic document loading mode).

The scanner body 1 comprises a housing 2 with a bottom 2a in which a scanning slit 2b having a length nearly equal to the effective image scanning width of the scanner is formed, image reading means 4 for optically reading out image data from the document, a circuit board 6, a motor 8, and driving rollers 10. The image reading means 4 and the motor 8 are fixed on the bottom 2a. The circuit board 6 is supported on a mounting frame 11 within the housing 2. The driving rollers 10 are formed of two rows of rollers 10a and 10b respectively held by driving shafts 12a and 12b rotatably supported by the mounting frame 11.

The mounting frame 11 for supporting the circuit board 6 and driving rollers 10 is resiliently mounted on the housing 2 through spring means 11a so as to protect the circuit board 6 from shock and vibration and give proper resiliency to the driving rollers 10.

The given document D to be scanned moves relative to the scanner body 1, though the scanner body 1 moves on the document in the self-propelling mode. Accordingly, the relative moving direction in which the document D moves relative to the scanner body 1 in the manual document loading mode and the scanner body 1 moves relative to the document in the self-propelling mode is herein defined as the "document feeding direction" for convenience. The document D to be scanned for optically reading out image data is placed opposite to the bottom 2a of the scanner body 1. The document passage P defined between the scanner body 1 and cover member 20 united in the manual document loading mode has a document entrance M1 on the back side relative to the document feeding direction, and a document exit M2 on the front side relative to the same direction.

The image reading means 4 includes a linear image sensor formed of CCD or the like and lighting means for illuminating the document placed opposite to the bottom 2a of the scanner body 1, and has a function of optically reading out the image on the given document and converting image data thus obtained to electric data signals. The structure and elements constituting the image reading means 4 are by no means limitative and may be composed of any other conventional elements.

The circuit board 6 includes an image processing circuit for processing the image data read out by the image reading means 4, a control circuit for not only the image processing circuit but also the motor 8, and an interface circuit for sending out the image data processed in the image processing circuit to an external image processing device (not shown) such as a computer and word processor through a cable 6a and a connector 6b.

The motor 8 may preferably be a rotation-controllable electric motor such as a pulse motor, and is secured at one side portion on the bottom 2a other than the scanning slit 2b.

Through a power switch 9, an electric current is selectively supplied to an electric system including the image processing circuit and other circuits on the circuit board 6 and the motor 8. However, in place of the power switch 9, the supply of the electric current to the electric system in the scanner body 1 may be controlled from the external image processing device.

The driving rollers 10 consisting of the entrance side rollers 10a supported by the driving shaft 12a and the exit side rollers 10b supported by the driving shaft 12b are arranged on both sides of the scanning slit 2b, and partially protrude downward from the bottom 2a so as to come into touch with the image face on the document D to be scanned.

In this embodiment, the driving shaft 12a on the side of the document entrance M1 extends substantially over the whole width of the scanner body 1 and supports the four driving rollers 10a, and the driving shaft 12b on the side of the document exit M2 is shorter than the scanning slit 2b and supports the three driving rollers 10b. However, the length each of the driving shafts 12a and 12b and the number of the driving rollers 10 supported by the respective driving shafts 12a and 12b are not limitative.

The driving shafts 12a and 12b have gears 14a and 14b engaged with a toothed endless belt 8a through which the rotational motion produced by the motor 8 is transmitted to the driving shafts 12a and 12b.

The driving shaft 12a is provided on its one end with a gear 14c which is engaged with a driving gear 31 incorporated in the document feeder 30 through a gear hole 2d bored in the housing 2 of the scanner body 1 for driving the document feeder 30.

On the edge portion of the bottom 2a on the side of the document entrance M1, there is disposed a document sensor 16 consisting of a rotational sensor lever 16a rotatably supported by the mounting frame 11 and switching means 16b actuated by the sensor lever 16a.

The sensor lever 16a assumes its upright posture in the free state, with its lower end dangling below the lower parts of the driving rollers 10, so that it comes into contact with the document D placed opposite to the bottom 2a of the scanner body 1, and consequently, it is pushed up by the document to actuate the switching means 16b, thus detecting the document D.

Though the document sensor 16 in this embodiment is composed of such mechanical elements including the rotational sensor lever 16a, it may be formed of a non-contact photoelectric detector consisting of, for example, a light emitting element and a photodetector.

Within the scanner body 1, an electric power source 18 such as a battery is disposed above the image reading means 4. Though it is preferable to use a charging battery as the power source 18, a battery holder or an AC adapter may be mounted instead of the battery as occasion demands. In case of need, the power source 18 may of course be left out to make the scanner more small and light, and instead, an external power source may be utilized. However, it is desirable to use the power source 18 such as the charging battery to balance the scanner body 1, and particularly, permit the scanner body 1 to move stably along the image face of the document in the self-propelling mode. For this purpose, the charging battery may be preferably located aside a little to the side opposite to the motor 8, preserving the entire balance of the scanner body 1. Thus, by positioning the center of gravity of the scanner body 1 at the middle of the scanner body 1, the stability of the scanner body 1 can be improved.

The cover member 20 is formed in a flat plate having a plane shape coincident with the bottom 2a of the scanner body 1.

The cover member 20 is provided on its upper side 20a facing the bottom 2a of the scanner body i with engaging means 22 by which the cover member 20 is securely united to the scanner body 1. Each engaging means 22 in this embodiment is formed of a substantially L-shaped hook which is inserted into an engaging hole 2c formed in the bottom 2a of the scanner body 1 and cooperatively engaged with the edge of the engaging hole 2c in a hooked manner.

Though the substantially L-shaped engaging means 22 is used in this embodiment, this should not be understood as limitative, and may of course be of any type of engaging structure and is essential to enable the scanner body 1 and the cover member 20 to be detachably united with each other. Though it is desirable to position the engaging means 22 at the corner portions of the cover member 20 and correspondingly the engaging holes 2c at the corner portions of the bottom 2a of the scanner body, these engaging elements 22 and 2a may not necessarily be positioned at the corners in the light of the other components as shown in the illustrated embodiment.

In the side wall of the cover member 20 on the entrance M1 side, there are formed engaging holes 20a for receiving engaging means 34 of the document feeder 30, which will be described later in detail.

The cover member 20 is provided on its upper side with two rows of press rollers 24 corresponding to the driving rollers 10 on the bottom 2a of the scanner body 1. When uniting the cover member 20 to the scanner body 1, the press rollers 24 come into contact with the driving rollers 10 to form the document passage P therebetween in the manual document loading mode.

In order to bring the press rollers 24 in resilient contact with the driving rollers 10 with a moderate pressure force, the press rollers 24 may be held by resilient shafts. It is desirable that the pressure force of the press rollers 24 on the entrance M1 side should be somewhat stronger than that of the press rollers 24 on the exit M2 side, thus imparting an adequate tension to the document to be fed through the document passage P.

Figure 5:
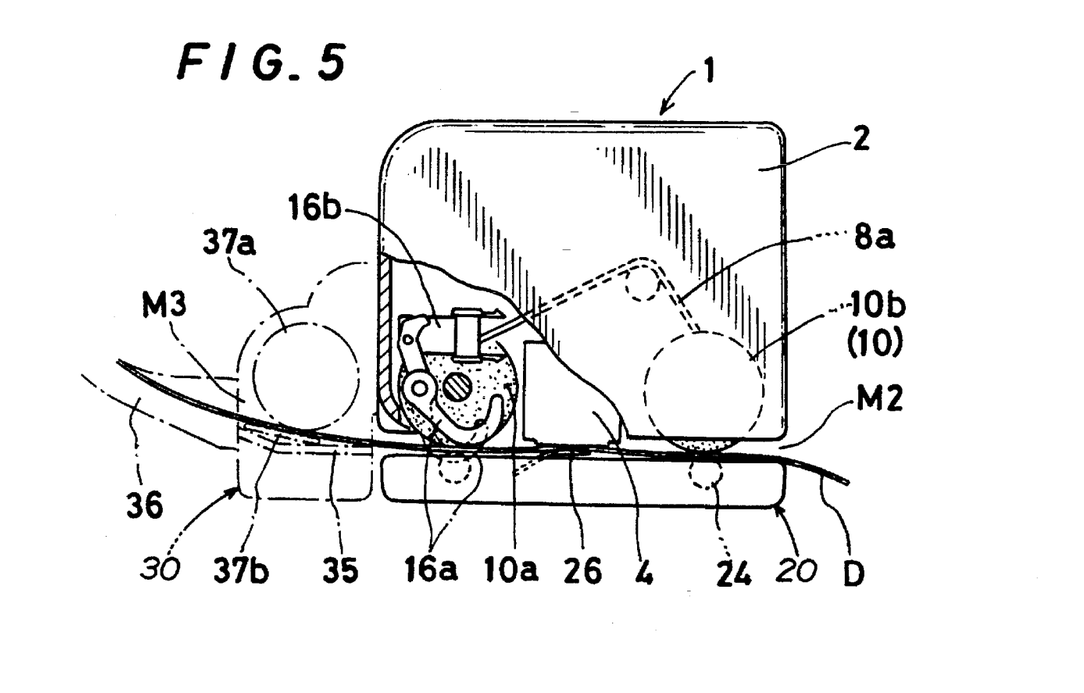
FIG. 5 is an explanatory view showing the document sensor in the manual document loading mode.

The cover member 20 further has a pressure member 26 between the two rows of the press rollers 24. The pressure member 26 comes in press contact with the image reading means 4 of the scanner body 1 when uniting the cover member 20 with the scanner body 1, so as to bring the document being fed through the document passage P in close contact with the image reading means 4 in scanning the image on the document as shown in FIG. 5. The pressure member 26 may be desirably formed of a flexible and resilient sheet or plate material such as of plastic resin. To permit the document to pass through the document passage P without hindrance, the sheet-like pressure member 26 should be inclined upward in the backward direction.

Though the pressure member 26 used in this embodiment is shaped in a sheet, it may be of course formed of a roller or other material, or omitted if the document being fed through the document passage P can be brought in close and stable contact with the image reading means 4 of the scanner body 1 by, for example, narrowing the distance between the rows of the driving rollers 10 or other possible measures.

In the drawings, reference numeral 28 denotes document guide pieces formed on the upper surface of the cover member 20 for restricting the width of the document to be scanned, and 29 denotes a hinged lid for opening and shutting the document entrance M1.

The document feeder 30 is detachably attached to the united scanner body 1 and cover member 20 on the entrance M1 side, so that a plurality of cut-sheet documents are automatically sent one by one into the document passage P between the scanner body 1 and the cover member 20. The document feeder 30 has engaging means 34 which come in engagement with engaging holes 20a formed in the cover member 20 on the entrance M1 side. The engaging means 34 in this embodiment is formed in a substantially L-shape so as to be hooked on the edge of the corresponding engaging hole 20a formed in the cover member 20.

Though the document feeder 30 in this embodiment comes into direct engagement with the cover member 20, it may be directly engaged with the scanner body 1. It is desirable to form the document feeder 30 with its lower surface leveling with the lower surface of the cover member 20 united with the scanner body 1 so as to secure the stability of the scanner.

The document feeder 30 has a document inlet opening M3 and a document guide member 35 extending from the document inlet opening M3 to the document entrance M1 of the united scanner body 1 and cover member 20. The document feeder 30 has a document tray 36 for stacking the cut-sheet documents thereon. The document feeder 30 further includes document separating means 37 consisting of at least one set of separation roller 37a and separation pad 37b which are in frictional contact with each other. The separation roller 37a is driven by acquiring rotational motion produced by the motor 8 in the scanner body 1 through the driving gear 31 which is engaged with the gear 14d held on the driving shaft 12a in the scanner body 1 as touched upon above. That is, when the scanner body 1 united with the cover member 20 and document feeder 30 is operated for scanning the document, the driving gear 31 is driven in conjunction with the driving rollers 10 to rotate the separation roller 37a. Therefore, even if two cut-sheet documents to be fed intend to come into between the separation roller 37a and the separation pad 37b, only the document being in direct contact with the separation roller 37a is allowed to advance to the document passage P defined between the scanner body 1 and the cover member 20 through the document entrance M1 by the rotating separation roller 37a. However, the other document being in frictional contact with the separation pad 37b is prevented from being forwarded toward the document passage P by the frictional resistance brought about by the separation pad 37b. Thus, the documents stacked on the document tray 36 can be fed infallibly one by one into the document passage P.

The manner of operation of the portable image scanner described in this connection with the illustrated embodiment will be explained hereinafter.

Manual Document Loading Mode

Figure 1:
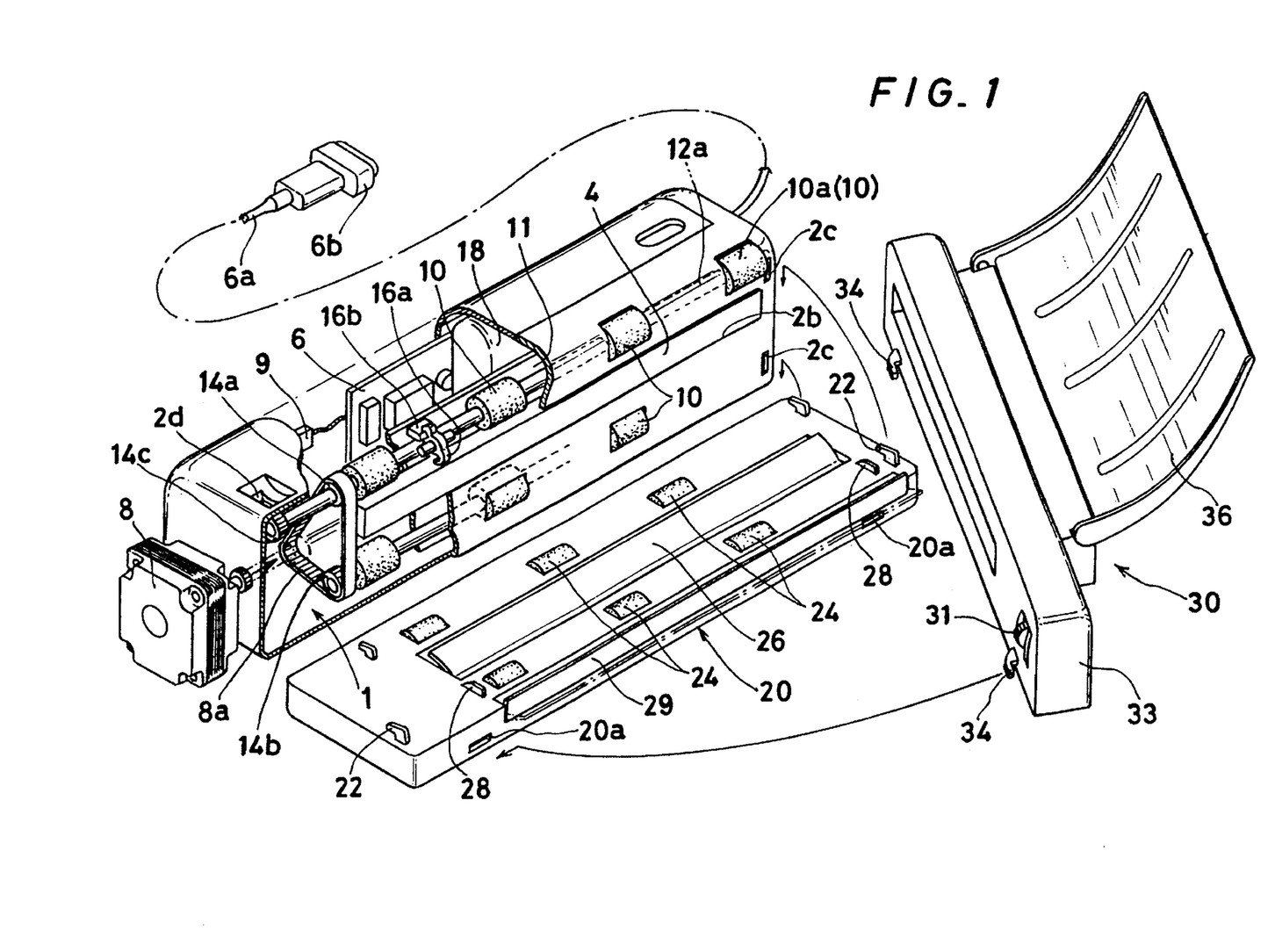
FIG. 1 is a partial cutaway perspective view showing one preferred embodiment of the portable image scanner according to this invention.
Figure 2:
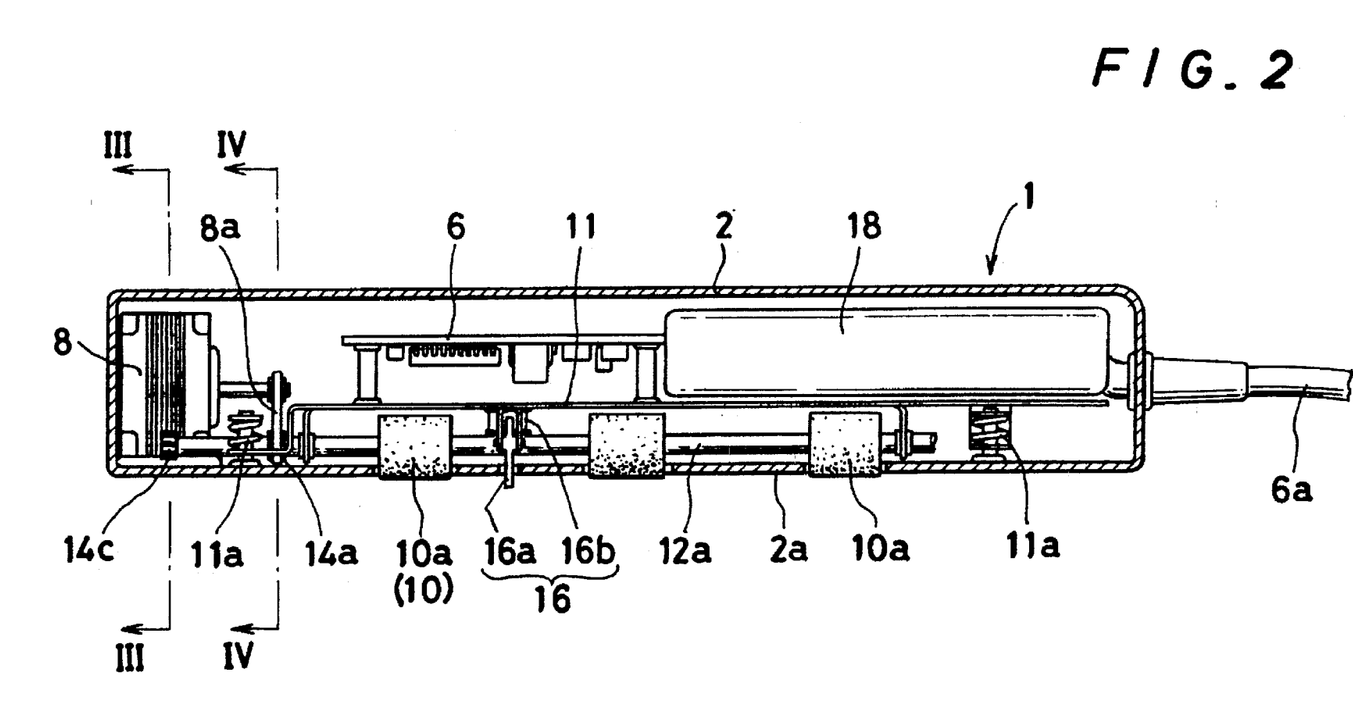
FIG. 2 is a front sectional view of the scanner body of this invention.
Figure 3:
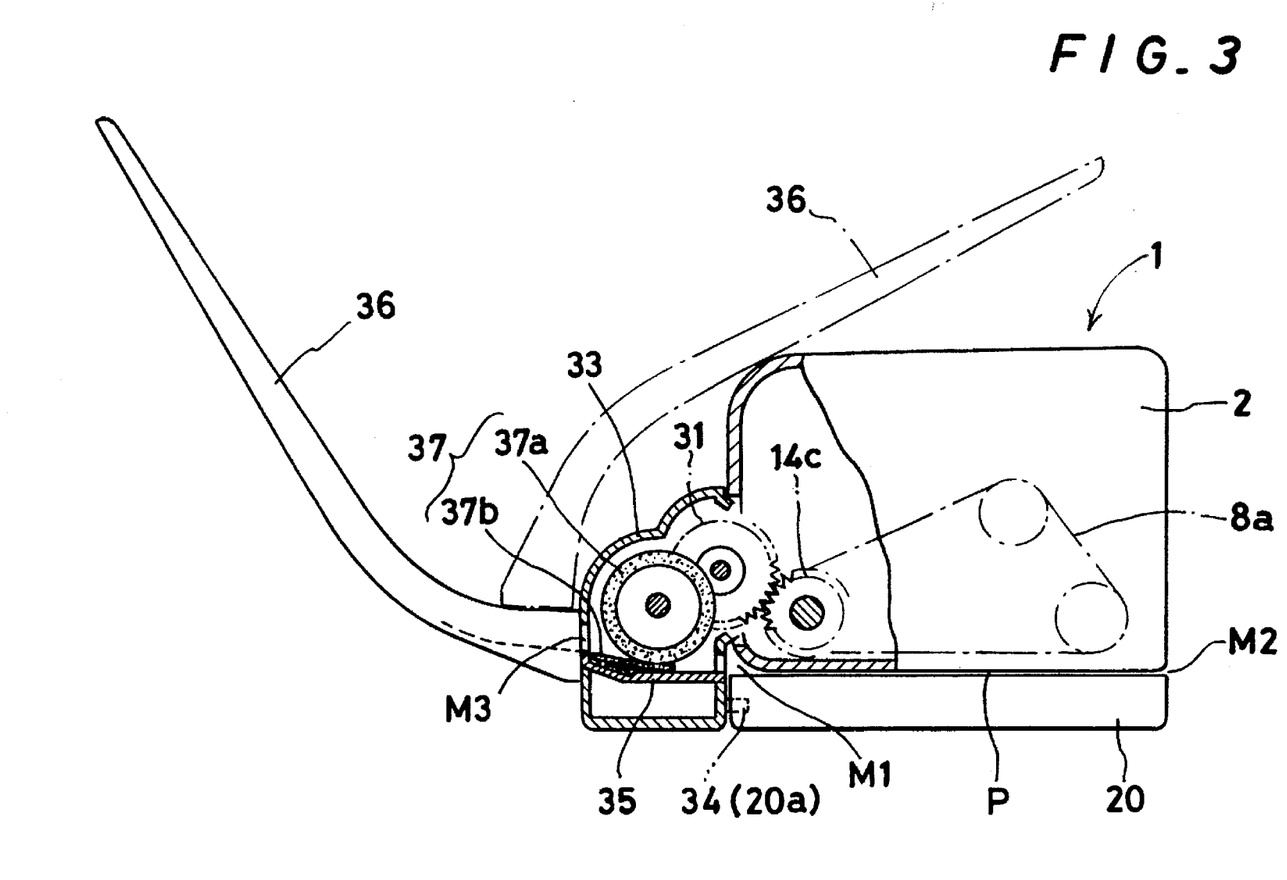
FIG. 3 is a side sectional view taken on line III—III in FIG. 2, showing the scanner with the document feeder of this invention.
Figure 4:
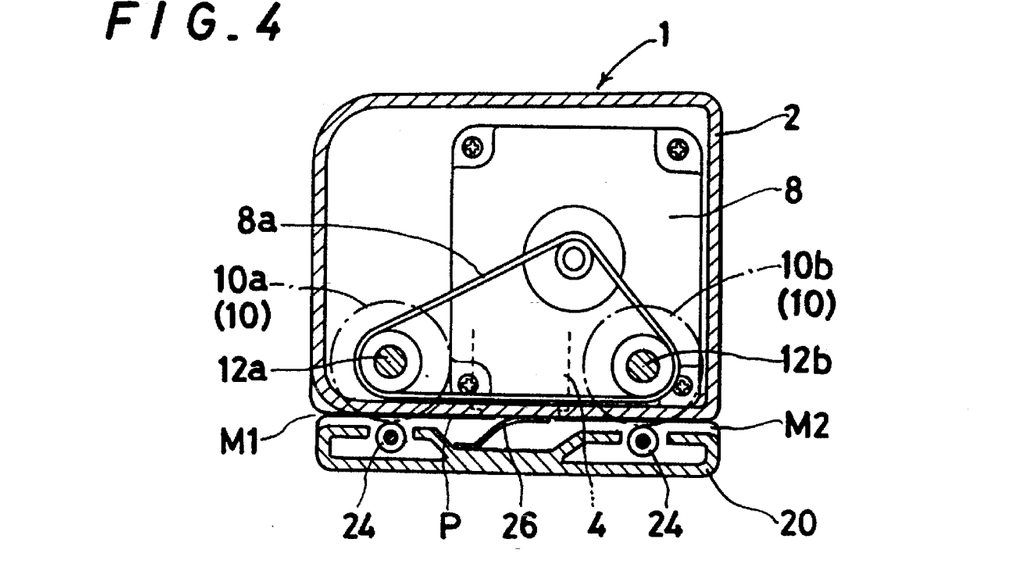
FIG. 4 is a side sectional view taken on line IV—IV in FIG. 2.

In the case of manually loading a single cut-sheet document to be scanned, the cover member 20 is attached to the scanner body 1. The connection of the cover member 20 to the scanner body 1 is accomplished by hooking the engaging means 22 in the engaging holes 2c formed in the bottom 2a of the scanner body 1. When the scanner body 1 is united with the cover member 20, the driving rollers of the scanner body 1 are in frictional contact with the press rollers 24 on the cover member 20 as illustrated in FIG. 4.

Even in the ready state in which the scanner body 1 is switched on, if the cut-sheet document is not introduced into the document entrance M1, the sensor lever 16a of the document sensor 16 assumes its non-operated state as indicated by the imaginary line in FIG. 5, as a result of which the motor 8 is not yet activated.

By inserting the cut-sheet document D into the document entrance M1 by hand, the sensor lever 16a is pushed up to switch on the switching means 16b of the document sensor 16, thereby activating the motor 8 to rotate the driving rollers 10 through the toothed endless belt 8a. With the rotation of the driving rollers 10, the document D advances toward the document exit M2 through the document passage P while being scanned to read out the image data on the document.

To be more specific, in the manual document loading mode, the image scanning operation is started after a prescribed time of detecting the leading end of the document D introduced through the document entrance M1 with the document sensor 16. In other words, the image scanning operation is controlled so as to scan the document D at the time that the document D reaches the image reading means 4.

When the document D completely passes through the sensor lever 16a, the tail end of the document D is detected to turn off the switching means 16b. However, the motor 8 is controlled to continue rotating until a prescribed time elapses, so that the document D is completely sent out through the document exit M2.

As described above, the cut-sheet document manually inserted into the document entrance M1 between the united scanner body 1 and cover member 20 is subjected to image scanning while being automatically forwarded along the document passage P, and at the time, the image data read out from the document by the image reading means 4 are delivered in succession to the external image processing device such as a computer electrically connected to the scanner body 1. The image scanning area (image width and length) on the document D can be determined with complete control by the external image processing device.

Self-propelling Mode

In the case of moving the scanner body 1 on a thick document such as a book for scanning and reading out the image data on the document, the scanner body 1 is separated from the cover member 20. At the time that the independent scanner body 1 is put on the document, the sensor lever 16a is in touch with the image face of the document and pushed up to turn the document sensor 16 into its ON state, so that the scanner body 1 assumes its ready state for scanning. Then, by switching on the power switch 9 or operating the external image processing device to give a start instruction to the scanner body 1, the motor 8 starts rotating to drive the driving rollers 10, consequently to move the scanner body 1 on the document D while reading out the image date from the document with the image reading means 4.

While the scanner body 1 moves along the image face of the document, the sensor lever 16a is pushed up by the document, maintaining the document sensor 16 in the ON state, and slides following the moving scanner body 1

To halt the scanning operation, the operator may give a stop instruction to the external image processing device connected to the scanner body 1 or merely lift up the scanner body i to turn off the document sensor 16.

Figure 6:
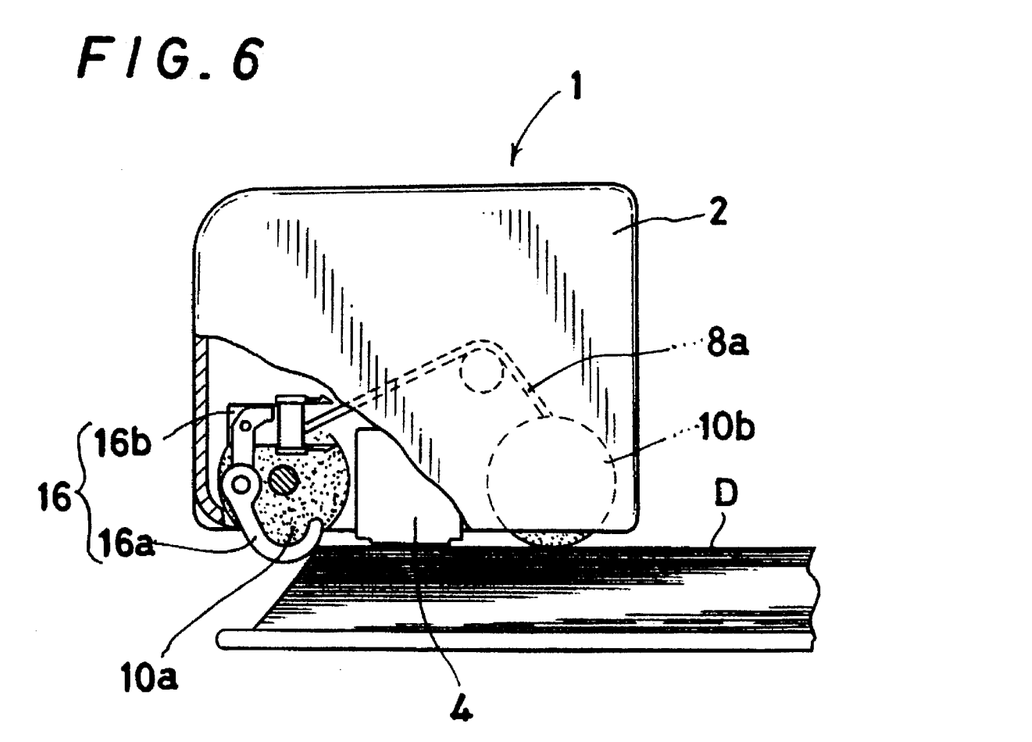
FIG. 6 is an explanatory view showing the document sensor in the self-propelling mode.
Figure 7:
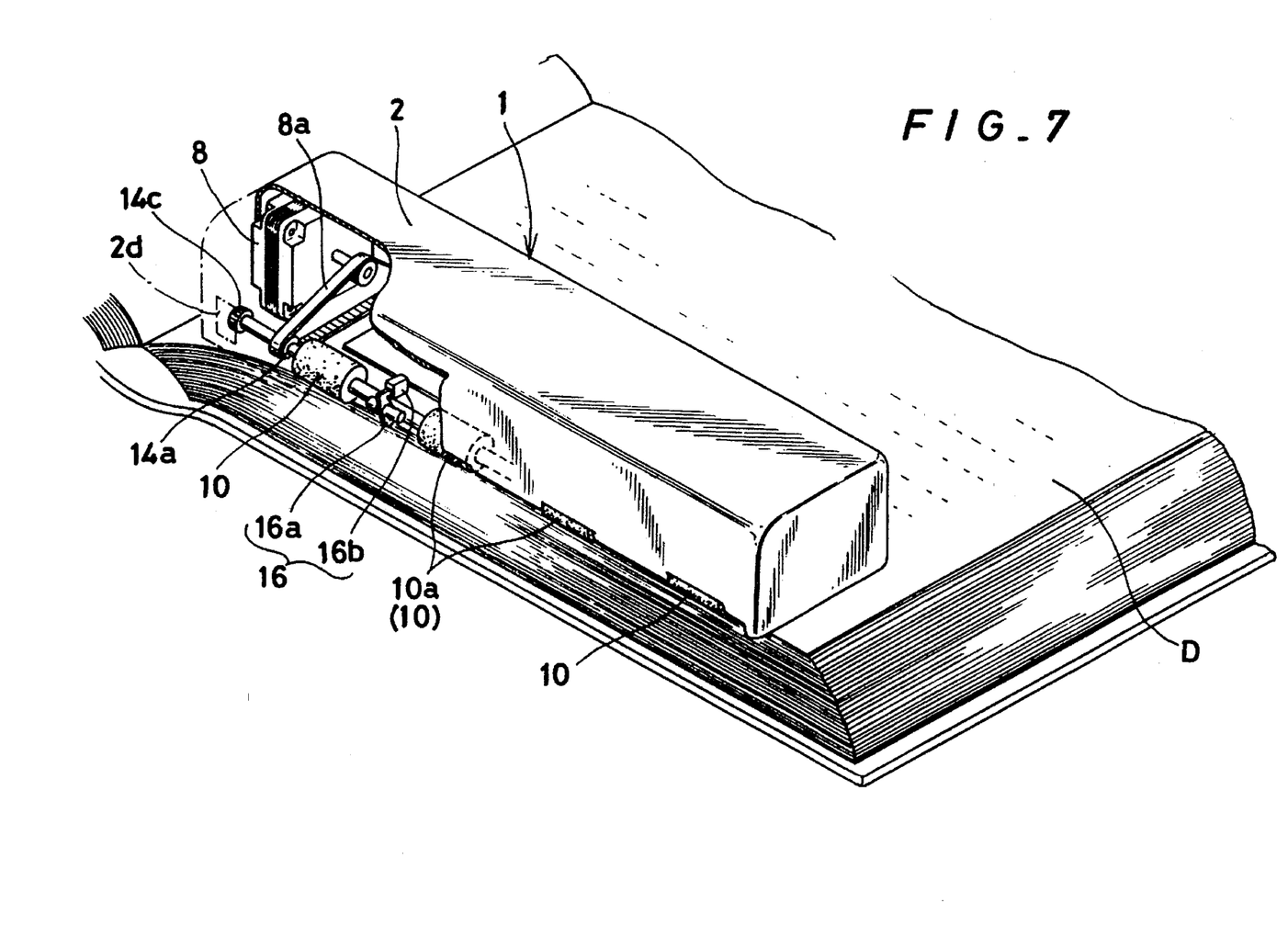
FIG. 7 is an explanatory view showing the scanner body stopping at the edge portion of the thick document in the self-propelling mode.

Also, the scanner body 1 moving along the image face of the document stops automatically when arriving at the edge portion or level difference of the thick document, since the sensor lever 16a comes off from the edge of the thick document to turn off the document sensor 16 as shown in FIGS. 6 and 7, thus preventing the scanner body 1 from falling out of the thick document due to carelessness. In this case, it is desirable to issue a warning sound and/or signal light at the time of stopping the movement of the scanner body 1 when the edge or level difference of the document is detected by the sensor lever 16a.

Though the scanner body 1 is basically deactivated to stop moving and image reading at the moment that the edge or level difference of the document is detected, it is rather desirable to move a little the scanner body backward at that time, thereby securing its stability on the document.

Automatic Document Loading Mode

In the case of automatically introducing the documents one by one into the document passage P formed between the scanner body 1 and the cover member 20 which are united with each other for attaining the manual document loading mode as noted above, the document feeder 30 is attached to the united scanner body 1 and cover member 20 as shown by the imaginary line in FIG. 5.

On the document tray 36 of the document feeder 30 attached to the united scanner body 1 and cover member 20, one or more cut-sheet documents are stacked with their leading ends touching the separation means 37 within the document inlet opening M3 of the document feeder 30. By giving a scanning instruction to the scanner body 1 in that state, the motor 8 starts rotating to simultaneously drive the driving rollers 10 and the separation roller 37a. Even if two or more cut-sheet documents come into between the separation roller 37a and the separation pad 37b, only the document being in direct contact with the separation roller 37a is permitted to pass therethrough toward the document passage P defined between the united scanner body 1 and cover member 20. Thus, the cut-sheet documents can be surely sent one by one into the document passage P.

Until the document sent into the document passage P through the document entrance M1 is completely discharged from the document exit M2, the same operation as in the manual document loading mode is executed.

EFFECT OF THE INVENTION

As is clear from the description given above, the portable image scanner of the present invention can reliably scan the whole image area on a cut-sheet document or thick document such as a book, and readily select the "manual document loading mode" for scanning the cut-sheet document and the "self-propelling mode" for scanning the thick document by a simple operation of attaching or detaching the cover member. The cover member which is attached to the scanner body when selecting the manual document loading mode is notably simple in structure and can easily be attached to or detached from the scanner body. Thus, according to the image scanner of this invention, various kinds of documents can be easily dealt with and subjected to high resolution scanning The image scanner of this invention incorporates the components including the charging battery which are arranged so as to acquire well balance and secure the stability thereof can be vary easily handled and made compact and therefore, it is suitable particularly to a hand-held computer.

Furthermore, since the image scanner of this invention has the document feeder, one or more cut-sheet documents can be automatically fed and scanned one by one in succession.

The portable image scanner of this invention has a safety mechanism including the sensor lever and switching means, so that the scanner body can automatically stop when arriving at the edge portion of the document.

Besides, the portable automatic image scanner of this invention can be properly applied for various uses such as image scanning, optical character recognition (OCR), optical pattern recognition and other image processing. By not only electronically processing the image data outputted from the image scanner, but also varying the rotation of the driving rollers for feeding the document at the reading rate maintained constant for reading out the image data from the document, an image resultantly reproduced can be freely reduced or magnified with ease congruously to the original image on the given document.

Utilizing the document sensor having the sensor lever which is generally operated by the document placed opposite to the bottom of the scanner body, an full automatic scanning system capable of automatically recognizing the manual document loading mode or the self-propelling mode can readily be accomplished by providing the sensor lever with a function of behaving when the cover member is united to the scanner body.

It is to be understood that the invention is not limited in its application to the details of construction and arrangement of parts illustrated in the accompanying drawings, since the invention is capable of other embodiments and of being practiced or carried out in various ways. Also it is to be understood that the phraselogy or terminology employed herein is for the purpose of description and not of limitation.

What is claimed is:

1. A portable image scanner for scanning a document to optically read an image on the document, comprising:

a scanner body including a bottom, a motor having sufficient motive force to move said scanner body, driving rollers disposed on said bottom and driven by said motor for imparting a relative motion to the document to be scanned, image reading means for optically reading out the image data on the document while relatively moving the document, and a document sensor for detecting the document placed opposite to said bottom;

a cover member detachably attached to said scanner body to define a document passage between itself and said scanner body and to cover said bottom of said scanner body;

said cover member being provided with press rollers which come into contact with said driving rollers of said scanner body so as to forward the document through said document passage by said driving rollers of said scanner body and said press rollers of said cover member when being united with said scanner body; and a document feeder having a document tray for stacking one or more documents thereon, said document feeder being positionable in a first position fully detached from said scanner body and cover member and in a second position attached to at least one of said scanner body and cover member which are united with each other, for sending out said documents one by one into said document passage formed between said united scanner body and cover member.

2. A portable image scanner for scanning a document to optically read an image on the document, comprising:

a scanner body including a bottom, a motor having sufficient motive force to move said scanner body, driving rollers disposed on said bottom and driven by said motor for imparting a relative motion to the document to be scanned, image reading means for optically reading out the image data on the document while relatively moving the document, and a document sensor for detecting the document placed opposite to said bottom;

a cover member detachably attached to said scanner body to define a document passage between itself and said scanner body and to cover said bottom of said scanner body;

said cover member being provided with press rollers which come into contact with said driving rollers of said scanner body so as to forward the document through said document passage by said driving rollers of said scanner body and said press rollers of said cover member when being united with said scanner body, wherein said scanner body and cover member have cooperative engaging means composed of substantially L-shape hooks formed on said cover member, and corresponding engaging holes formed in said scanner body for receiving said hooks, and serving to securely unite said scanner body and cover member with each other; and a document feeder having a document tray for stacking one or more documents thereon, said document feeder being positionable in a first position fully detached from said scanner body and cover member and in a second position attached to at least one of said scanner body and cover member which are united with each other, for sending out said documents one by one into said document passage formed between said united scanner body and cover member.

3. A portable image scanner according to claim 2, wherein said document feeder having separation means including at least one separation roller and a separation pad being in frictional contact with said separation roller for sending out the documents stacked on said document tray one by one through between said separation roller and separation pad.

4. A portable image scanner according to claim 2, wherein said cover member and document feeder have cooperative engaging means composed of substantially L-shape hooks formed on said document feeder, and corresponding engaging holes formed in said cover member for receiving said hooks, and serving to securely unite said document feeder and cover member with each other.

5. A portable image scanner for scanning a document to optically read out image data on the document and deliver said image data to an external image processing device, comprising:

a scanner body including a housing having a bottom with a scanning slit, a mounting frame mounted resiliently on said bottom through spring means, a motor having sufficient motive force to move said scanner body mounted on said bottom, two rows of driving rollers which rows are respectively supported by parallel driving shafts held by said mounting frame and driven by said motor for imparting a relative motion to the document to be scanned, image reading means confronting said scanning slit between said rows of driving rollers and adapted for optically reading out the image data on the document while relatively moving the document, a circuit board mounted on said mounting frame and including an image processing circuit, a control circuit and an interface circuit, and a document sensor including a sensor lever which is operated by the document placed opposite to said bottom of the scanner body and switching means which is actuated by said sensor lever and adapted for detecting the document placed opposite to said bottom;

a cover member detachably attached to said bottom of said scanner body to derive a document passage between said cover member and said scanner body, and including press rollers coming into contact with said driving rollers on said scanner body when uniting said scanner body and cover member;

said scanner body and cover member having cooperatives engaging means composed of substantially L-shape hooks formed on said cover member, and corresponding engaging holes formed in said scanner body for receiving said hooks, and serving to securely unite said scanner body and cover member with each other;

said document being forwarded through said document passage by said driving rollers of said scanner body and said press rollers of said cover member when being united with said scanner body;

said scanner body separated from said cover member being permitted to move on said document by driving said driving rollers while scanning the image of said document; and a document feeder having a document tray for stacking one or more documents thereon, and separation means including at least one separation roller and separation pad for permitting said documents to pass one by one, said document feeder being positionable in a first position fully detached from said scanner body and cover member and in a second position attached to at least one of said scanner body and cover member which are united with each other, for sending out said documents one by one into said document passage defined between said united scanner body and cover member.

6. A portable image scanner for scanning a document to optically read out an image on the document, which comprises:

a scanner body including a bottom, a motor, driving rollers disposed on said bottom and driven by said motor for imparting a relative motion to the document to be scanned, image reading means for optically reading out the image data on the document while relatively moving the document, and a document sensor for detecting the document placed opposite to said bottom, a cover member detachably attached to said scanner body to define a document passage between said cover member and said scanner body and to cover said bottom of said scanner body, said cover member being provided with press rollers which come into contact with said driving rollers of said scanner body so as to forward the document through said document passage by said driving rollers of said scanner body and said press rollers of said cover member when being united with said scanner body, and a document feeder having a document tray for stacking one or more documents thereon, said document feeder being positionable in a first position fully detached from said scanner body and cover member and in a second position attached to at least one of said scanner body and cover member which are united with each other, for sending out said documents one by one into said document passage formed between said united scanner body and cover member.

7. A portable image scanner for scanning a document to optically read out image data on the document and deliver said image data to an external image processing device, which comprises:

a scanner body including a housing having a bottom with a scanning slit, a mounting frame mounted resiliently on said bottom through spring means, a motor having sufficient motive force to move said scanner body mounted on said bottom, two rows of driving rollers, which rows are respectively supported by parallel driving shafts held by said mounting frame and driven by said motor for imparting a relative motion to the document to be scanned, image reading means confronting said scanning slit between said rows of driving rollers and adapted for optically reading out the image data on the document while relatively moving the document, a circuit board mounted on said mounting frame and including an image processing circuit, a control circuit and an interface circuit, and a document sensor including a sensor lever which is operated by the document placed opposite to said bottom of the scanner body and switching means which is actuated by said sensor lever and adapted for detecting the document placed opposite to said bottom, and a cover member detachably attached to said bottom of said scanner body to define a document passage between said cover member and said scanner body, and including press rollers coming into contact with said driving rollers on said scanner body when uniting said scanner body and cover member, said scanner body and cover member having cooperatives engaging means composed of substantially L-shape hooks formed on said cover member, and corresponding engaging holes formed in said scanner body for receiving said hooks, and serving to securely unite said scanner body and cover member with each other; and said document being forwarded through said document passage by said driving rollers of said scanner body and said press rollers of said cover member when being united with said scanner body;

said scanner body separated from said cover member being permitted to move on said document by driving said driving rollers while scanning the image of said document; and a document feeder having a document tray for stacking one or more documents thereon, and separation means including at least one separation roller and separation pad for permitting said documents to pass one by one, said document feeder being positionable in a first position fully detached from said scanner body and cover member and in a second position attached to at least one of said scanner body and cover member which are united with each other, for sending out said documents one by one into said document passage defined between said united scanner body and cover member.

8. A portable image scanner for scanning a document to optically read an image on the document, comprising:

a scanner body including a housing having a bottom, a motor having sufficient motive force to move said scanner body, driving rollers driven by said motor for imparting a relative motion to the document to be scanned, a mounting frame for supporting said driving rollers, said mounting frame being mounted resiliently on said housing through spring means, and image reading means for optically reading out the image data on the document while relatively moving the document, and a document sensor for detecting the document placed opposite to said bottom;

a cover member detachably attached to said scanner body to define a document passage between itself and said scanner body and to cover said bottom of said scanner body, said cover member being provided with press rollers which come into contact with said driving rollers of said scanner body so as to forward the document through said document passage by said driving rollers of said scanner body and said press rollers of said cover member when being united with said scanner body; and a document feeder having a document tray for stacking one or more documents thereon, said document feeder being positionable in a first position fully detached from said scanner body and cover member and in a second position attached to at least one of said scanner body and cover member which are united with each other, for sending out said documents one by one into said document passage formed between said united scanner body and cover member.

* * * * *